United States Patent
Fure

[11] Patent Number: 6,117,004
[45] Date of Patent: Sep. 12, 2000

[54] FISH CLEANING APPARATUS

[76] Inventor: Clarence J. Fure, 406 W. Bluff St., Cassville, Wis. 53806

[21] Appl. No.: 09/347,783

[22] Filed: Jul. 6, 1999

[51] Int. Cl.$^7$ .................................................... A22C 25/06
[52] U.S. Cl. ........................... 452/196; 452/194; 452/161
[58] Field of Search ................................... 452/194, 195, 452/196, 161

[56] References Cited

U.S. PATENT DOCUMENTS

| | | |
|---|---|---|
| D. 264,531 | 5/1982 | Trode . |
| D. 307,365 | 4/1990 | Dry et al. . |
| D. 308,792 | 6/1990 | Lord et al. . |
| D. 375,877 | 11/1996 | Dotson . |
| 3,248,751 | 5/1966 | Wilborn ................................... 452/195 |
| 3,790,988 | 2/1974 | Maxwell ................................. 452/195 |
| 4,454,628 | 6/1984 | Olson . |
| 5,116,279 | 5/1992 | Perry ....................................... 452/194 |
| 5,542,359 | 8/1996 | Polries . |
| 5,628,681 | 5/1997 | White . |

Primary Examiner—Willis Little
Attorney, Agent, or Firm—David J. Archer

[57] ABSTRACT

A fish cleaning apparatus is disclosed for securely holding a fish during cleaning and filleting thereof. The apparatus includes a supporting frame having a first and a second end wall and a first and a second side wall, the frame having a top and a bottom. A first and a second cleaning board are supported by the frame, the boards being disposed angularly relative to each other for defining there between a drain. The arrangement is such that when the fish is being cleaned, parts removed from the fish drain along the boards through the drain. A rod is rotatably supported by the frame and disposed adjacent to the drain, the rod having a first and a second extremity. A holder has a proximal and a distal end, the proximal end being secured to the rod, the fish being impaled on the distal end of the holder. A handle is secured to the rod for rotating the rod from a first location in which the holder is disposed adjacent to the first board for securely holding the fish against the first board for permitting cleaning of a first side of the fish. The handle permits rotation of the rod to a second location thereof in which the holder is disposed adjacent to the second board for securely holding the fish against the second board for permitting cleaning of a second side of the fish.

16 Claims, 3 Drawing Sheets

FISH CLEANING APPARATUS

BACKGROUND OF THE INVENTION

1. Field of the Invention

The present invention relates to a fish cleaning apparatus. More specifically, the present invention relates to a fish cleaning apparatus for securely holding a fish during cleaning and filleting thereof.

2. Description of Related Art

When fish are caught, it is desirable that such fish be cleaned and prepared as soon as possible so that the fresh flavor of the fish is maintained.

Accordingly, several prior art fish cleaning tables and the like have been proposed including tables for holding the fish during cleaning and filleting thereof. However, such prior proposals have suffered from the drawback that the fish is not always adequately supported during the aforementioned cleaning operation. Furthermore, such tables do not readily permit reversing of the fish so that both sides of the fish may be descaled.

Therefore, it is a primary feature of the present invention to provide a lish cleaning apparatus that overcomes the disadvantages of the prior fish cleaning devices and which makes a considerable contribution to the art of cleaning and preparing fish.

Another feature of the present invention is the provision of a fish cleaning apparatus that firmly holds the fish against a board during a cleaning of a first side of the fish and subsequently permitting the fish to be reversed for cleaning a second side of the fish.

Other features and advantages of the present invention will be readily apparent to those skilled in the art by a careful consideration of the detailed description of a preferred embodiment of the present invention described herein and as shown in the annexed drawings.

SUMMARY OF THE INVENTION

A fish cleaning apparatus is disclosed for securely holding a fish during cleaning and filleting thereof. The apparatus includes a supporting frame having a first and a second end wall and a first and a second side wall, the frame having a top and a bottom. A first and a second cleaning board are supported by the frame, the boards being disposed angularly relative to each other for defining there between a drain. The arrangement is such that when the fish is being cleaned, parts removed from the fish drain along the boards through the drain. A rod is rotatably supported by the frame and disposed adjacent to the drain, the rod having a first and a second extremity. A holder has a proximal and a distal end, the proximal end being secured to the rod, the fish being impaled on the distal end of tie holder. A handle is secured to the rod for rotating the rod from a first location in which the holder is disposed adjacent to the first board for securely holding the fish against the first board for permitting cleaning of a first side of the fish. The handle permits rotation of the rod to a second location thereof in which the holder is disposed adjacent to the second board for securely holding the fish against the second board for permitting cleaning of a second side of the fish.

In a more specific embodiment of the present invention, the end walls are disposed parallel and spaced relative to each other and the side walls extend between the end walls, the side walls being disposed parallel and spaced relative to each other.

Also, the first side wall defines a V-shaped configuration adjacent to the top of the frame for supporting the boards and the second side wall defines a further V-shaped configuration adjacent to the top of the frame for supporting the boards.

The frame also includes a first extension which extends from the first side wall adjacent to the top of the frame, the first extension defining a first hole. A second extension extends from the second side wall adjacent to the top of the frame, the second extension defining a second hole. The arrangement is such that the rod extends through the holes and is rotatably supported by the extensions. More specifically, the rod extends through the first hole and approximately three quarters way through the second hole. A threaded bolt having a first and a second end extends through a coaxial bore defined by the rod. The bolt is captured within the bore by a nut which cooperates with the first end of the bolt. The second end of the bolt extends through the remaining one quarter of the way through the second hole and a wing nut threadably engages the threaded second end of the bolt so that when the wing nut is tightened, the wing nut reacts with the second side wall so as to brake the rod against rotation thereof.

In a preferred embodiment of the present invention, each of the boards is of rectangular configuration, the first board being secured to the top of the frame by the first end wall and the side walls, the first board extending from the first end wall in a direction from the drain towards the first end wall.

Additionally, the second board is secured to the top of the frame by the second end wall and the side walls, the second board extending from the second end wall in a further direction from the drain towards the second end wall.

Furthermore, the rod is of cylindrical configuration and is disposed above the drain.

The holder extends perpendicularly away from the rod such that when the rod is rotated, the fish impaled on the holder is moved between the locations.

Also, the proximal end of the holder is receivably secured within an orifice defined by the rod, the distal end of the holder defining a point for facilitating impalement of the fish.

Moreover, the handle is secured to the first extremity of the rod, the handle being disposed parallel and spaced relative to the holder.

The fish cleaning apparatus also includes a first plurality of spikes which protrude from the first board such that when the rod is disposed in the first location thereof, the second side of the fish is securely positioned against the first spikes for facilitating cleaning of the first side of the fish.

Additionally, a second plurality of spikes protrude from the second board such that when the rod is disposed in the second location thereof, the first side of the fish is securely positioned against the second spikes for facilitating cleaning of the second side of the fish.

A catch pan is removably disposed within the frame beneath the drain for catching the parts removed from the fish. The pan includes a framework of rectangular configuration and a panhandle extending from the framework for moving the pan relative to the frame.

The pan also includes a screen which extends across the framework for separating the parts removed from the fish.

A wing nut threadably engages the second extremity of the rod such that when the wing nut is tightened, the rod is locked against rotation thereof so that the holder and fish impaled thereon are selectively disposed in the first and second locations for permitting cleaning and descaling of both sides of the fish.

In a preferred embodiment of the present invention, the frame and the boards are fabricated from wood. However, the frame and boards could be fabricated from a number of other materials such as plastics materials and or fiberglass or the like.

Many modifications and variations of the present invention will be readily apparent to those skilled in the art. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figures 1, 2:
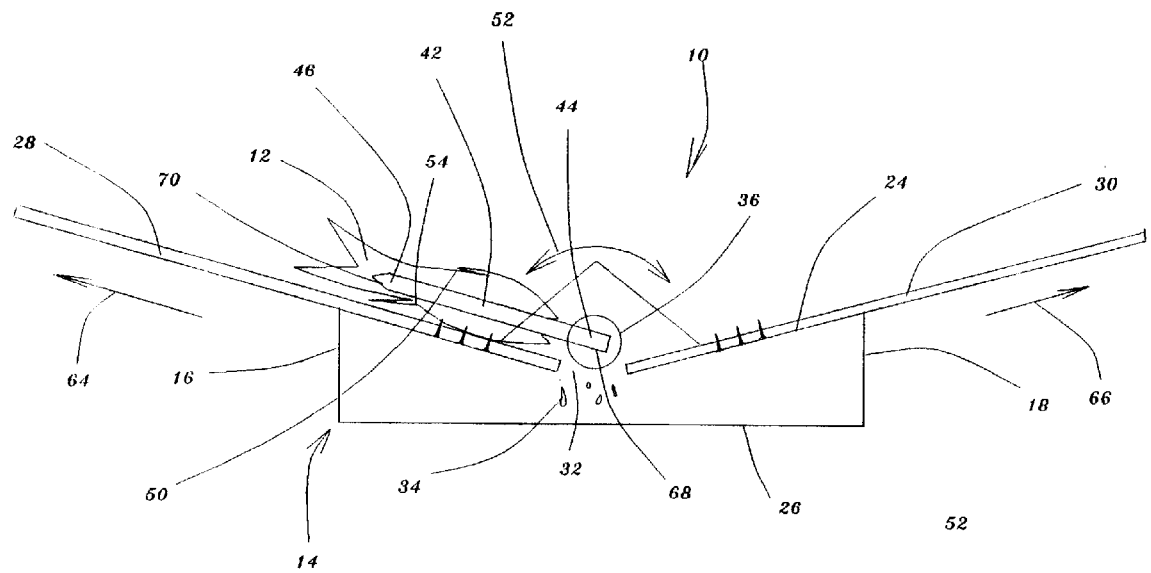
FIG. 1 is a side elevational view of the fish cleaning apparatus according to the present invention.
FIG. 2 is a top plan view of the apparatus shown in FIG. 1.

FIG. 1 is a side elevational view of a fish cleaning apparatus generally designated 10 according to the present invention. The apparatus 10 is used for securely holding a fish 12 during cleaning and filleting thereof. The apparatus 10 includes a supporting frame generally designated 14 having a first and a second end wall 16 and 18 respectively.

Figure 3:
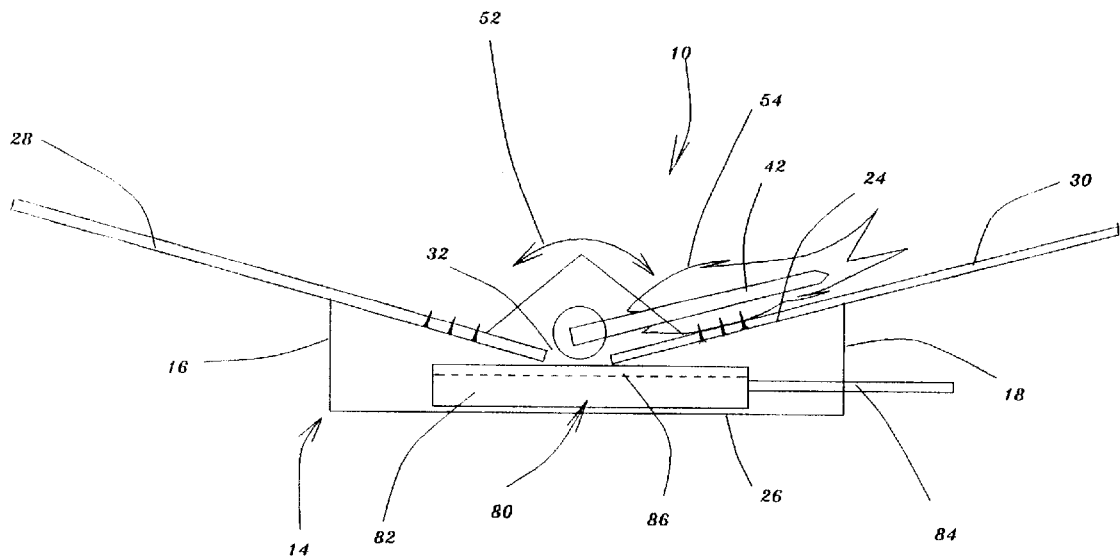
FIG. 3 is a similar view to that shown in FIG. 1 but shows the rod in the second location thereof and with a catch pan inserted under the drain.
Figure 4:
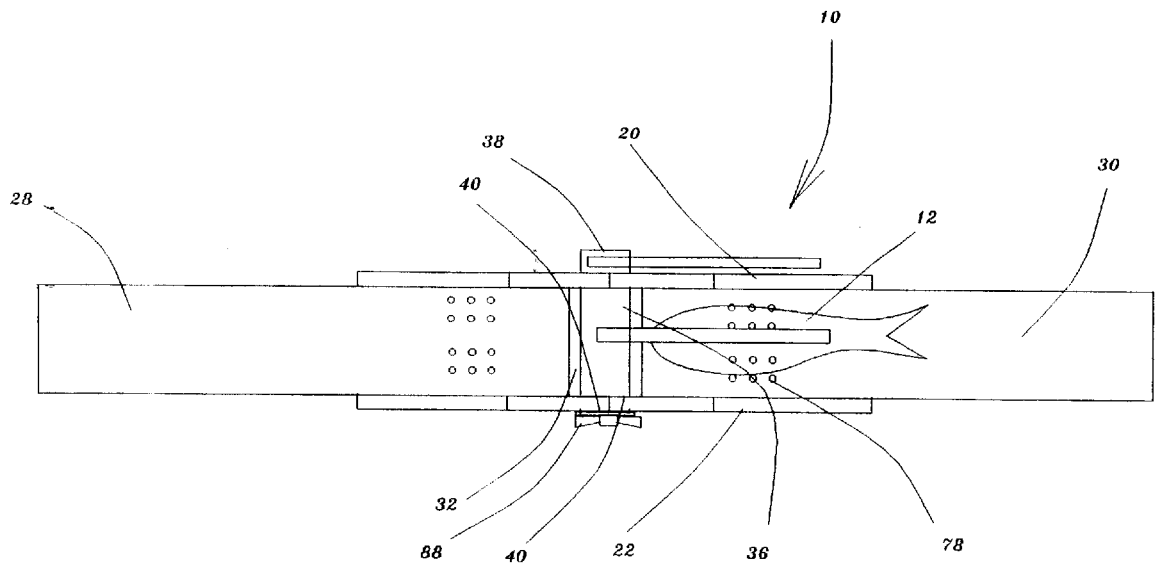
FIG. 4 is a top plan view of the apparatus shown in FIG. 3.

FIG. 2 is a top plan view of the apparatus 10 shown in FIG. 1. As shown in FIG. 2, the frame 14 includes a first and a second side wall 20 and 22 respectively, the frame 14 having a top and a bottom 24 and 26 respectively. A first and a second cleaning board 28 and 30 respectively are supported by the frame 14, the boards 28 and 30 being disposed angularly relative to each other for defining there between a drain 32. The arrangement is such that when the fish 12 is being cleaned, parts 34 such as scales and the like removed from the fish 12 drain along the boards 28 and 30 through the drain 32. A rod 36 is rotatably supported by the frame 14 and disposed adjacent to the drain 32, the rod 36 having a first and a second extremity 38 and 40 respectively. A holder 42 has a proximal and a distal end 44 and 46 respectively, the proximal end 44 being secured to the rod 36, the fish 12 being impaled on the distal end 46 of the holder 42. A handle 48 is secured to the rod 36 for rotating the rod 36 from a first location as shown in FIGS. 1 and 2 in which the holder 42 is disposed adjacent to the first board 28 for securely holding the fish 12 against the first board 28 for permitting cleaning of a first side 50 of the fish 12. Tile handle 48 permits rotation as indicated by the arrow 52 of the rod 36 to a second location thereof as shown in FIGS. 3 and 4 in which the holder 42 is disposed adjacent to the second board 30 for securely holding the fish 12 against the second board 30 for permitting cleaning of a second side 54 of the fish 12.

In a more specific embodiment of the present invention, the end walls 16 and 18 of the frame 14 are disposed parallel and spaced relative to each other and the side walls 20 and 22 extend between the end walls 16 and 18, the side walls 20 and 22 being disposed parallel and spaced relative to each other.

Also, the first side wall 20 defines a V-shaped configuration adjacent to the top 24 of the frame 14 for supporting the boards 28 and 30 and the second side wall 22 defines a further V-shaped configuration adjacent to the top 24 of the frame 14 for supporting the boards 28 and 30.

Figure 6:
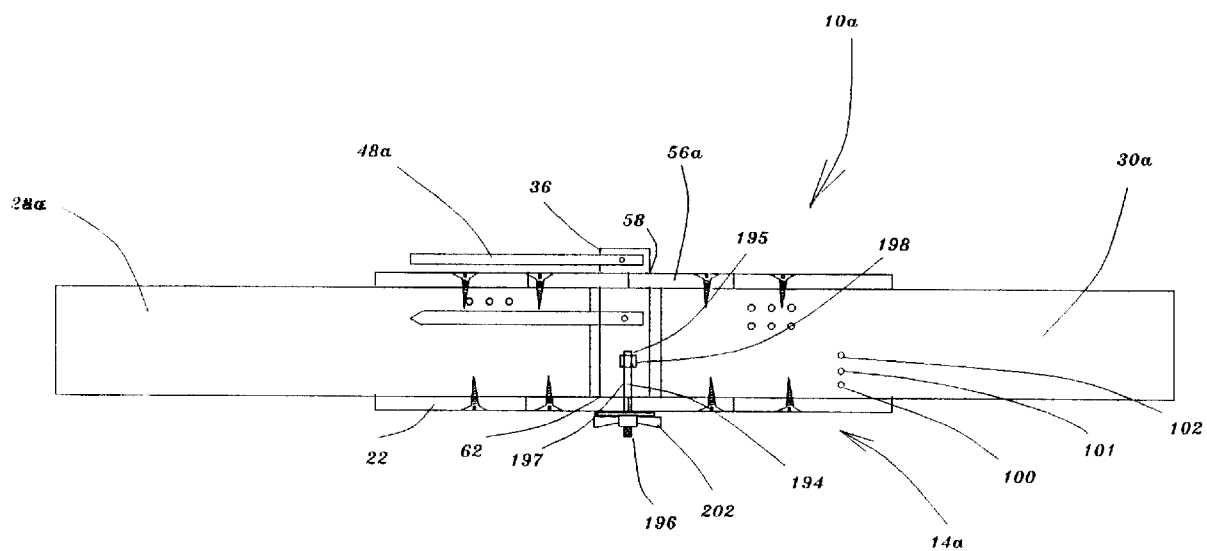
FIG. 6 is a top plan view of the apparatus shown in FIG. 5.

The frame 14 also includes a first extension 56 which extends from the first side wall 20 adjacent to the top 24 of the frame 14, the first extension 56 defining a first hole 58. A second extension 60 extends from the second side wall 22 adjacent to the top 24 of the frame 14, the second extension 60 defining a second hole 62. The arrangement is such that the rod 36 extends through the holes 58 and 62 respectively and is rotatably supported as indicated by the arrow 52 by the extensions 56 and 60. More specifically, as shown in FIG. 6, the rod 36 extends through the hole 58 and approximately three quarters way through the other end that is the other hole 62. A threaded bolt 194 having a first and a second end 195 and 196 respectively extends through a coaxial bore 197 defined by the rod 36. The bolt 194 is captured within the bore 197 by a nut 198 which cooperates with the first end 195 of the bolt 194. The second end 196 of the bolt 194 extends through the remaining one quarter of the way through the hole 62 and a wing nut 202 threadably engages the threaded second end 196 of the bolt so that when the wing nut 202 is tightened, the wing nut 202 reacts with the second side wall 22 so as to brake the rod 36 against rotation thereof.

In a preferred embodiment of the present invention, each of the boards 28 and 30 is of rectangular configuration, the first board 28 being secured to the top 24 of the frame 14 by the first end wall 16 and the side walls 20 and 22, the first board 28 extending from the first end wall 16 in a direction as indicated by the arrow 64 from the drain 32 towards the first end wall 16.

Additionally, the second board 30 is secured to the top 24 of the frame 14 by the second end wall 18 and the side walls 20 and 22, the second board 30 extending from the second end wall 18 in a further direction as indicated by the arrow 66 from the drain 32 towards the second end wall 18.

Furthermore, the rod 36 is of cylindrical configuration and is disposed above the drain 32.

The holder 42 extends perpendicularly away from the rod 36 such that when tile rod 36 is rotated as indicated by the arrow 52, the fish 12 impaled on the holder 42 is moved between the locations.

Also, the proximal end 44 of the holder 42 is receivably secured within an orifice 68 defined by the rod 36, the distal end 46 of the holder 42 defining a point 70 for facilitating impalement of the fish 12.

Moreover, the handle 48 is secured to the first extremity 38 of the rod 36, the handle 48 being disposed parallel and spaced relative to the holder 42.

The fish cleaning apparatus 10 also includes a first plurality of spikes 72, 73 and 74 which protrude from the first board 28 such that when the rod 36 is disposed in the first location thereof, the second side 54 of the fish 12 is securely positioned against the first spikes 72–74 for facilitating cleaning of the first side 50 of the fish 12.

Additionally, a second plurality of spikes 76, 77 and 78 protrude from the second board 30 such that when the rod 36 is disposed in the second location thereof, the first side 50 of the fish 12 is securely positioned against the second spikes 76–78 for facilitating cleaning of the second side 54 of the fish 12.

A catch pan generally designated 80 is removably disposed within the frame 14 beneath the drain 32 for catching the parts 34 removed from the fish 12. The pan 80 includes a framework 82 of rectangular configuration and a pan-handle 84 extending from the framework 82 for moving the pan 80 relative to the frame 14.

The pan 80 also includes a screen 86 which extends across the framework 82 for separating the parts 34 removed from the fish 12.

A wing nut 88 threadably engages the second extremity 40 of the rod 36 such that when the wing nut 88 is tightened, the rod 36 is locked against rotation thereof so that the holder 42 and fish 12 impaled thereon are selectively disposed in the first and second locations for permitting cleaning and descaling of both sides 50 and 54 of the fish 12.

In a preferred embodiment of the present invention, the frame 14 and the boards 28 and 30 are fabricated from wood. However, the frame 14 and boards 28 and 30 could be fabricated from a number of other materials such as plastics materials and or fiberglass or the like.

Figure 5:
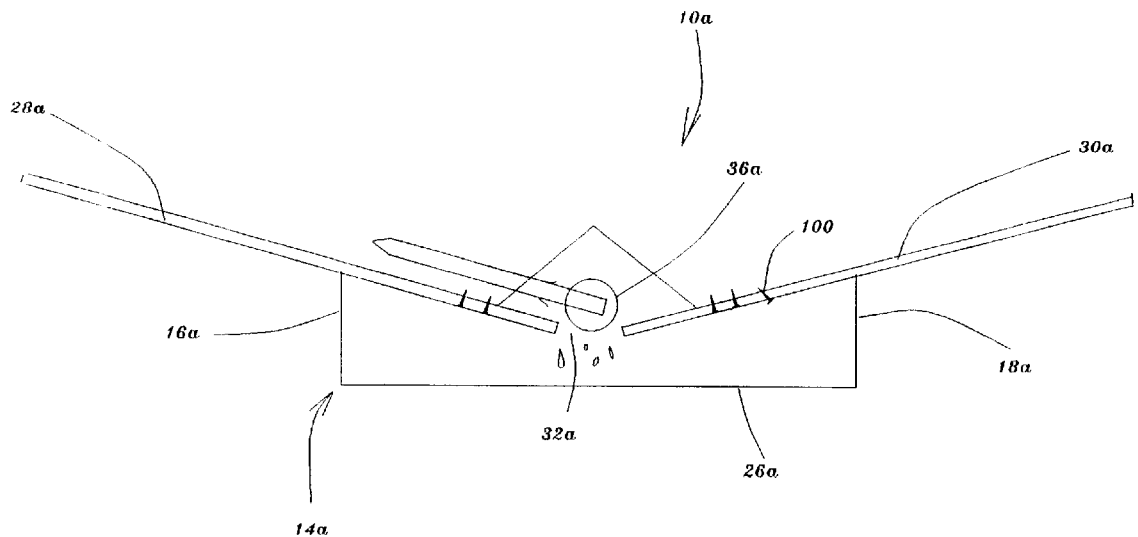
FIG. 5 is a side elevational view of a further embodiment of the present invention.

FIG. 5 is a side elevational view of a further embodiment of tile present invention. As shown in FIG. 5, after removing the fillet from the fish, the skin must also be removed from the other side of the meat. This is normally done by holding one end to the board while slicing tile meat from the skin. The aforementioned operation is much easier to do when the board includes small points 100, 101 and 102 to snag and hold the skin with the operators thumb while removing the meat. As shown in FIG. 6, the small points 100–102 are wood screws that are inserted into the board 30 at an angle of approximately 60 degrees to the surface of the board to hold the fish skin while removing the fillet with a sharp knife. The points 100–102 protrude approximately 1/16th of an inch from the board in order to snag the skin while removing the meat.

In operation of the apparatus 10 according to the present invention, the fish 12 is impaled on the distal end 46 of the holder 42. Such impalement is accomplished by inserting the point 70 of the holder 42 into the mouth of the fish so that the fish is securely supported by the holder 42. The wing nut 88 is then released and the handle 48 is moved to rotate the holder 42 and fish 12 impaled thereon towards the first board 28 so that the spikes 72–74 engage the second side 54 of the fish for securely holding the fish 12 against the first board 28. Tile wing nut 88 is then tightened for permitting descaling and filleting the fish from the first side 50 thereof.

Subsequently, the wing nut 88 is released and the handle is rotated as indicated by the arrow 52 so that the spikes 76–78 engages the first side 50 of the fish. The wing nut is again tightened thus holding the fish against the second board for permitting cleaning of the fish from the second side 54 thereof. The parts 34 removed from the fish drain through the drain 32 into the catch pan 80 disposed beneath the drain 32.

The apparatus 10 permits convenient cleaning of a fish at the bank of a river, seashore or on a boat or the like.

The present invention provides a unique arrangement for firmly holding a fish during cleaning thereof and permits selective access to both sides of the fish.

What is claimed is:

1. A fish cleaning apparatus for securely holding a fish during cleaning and filleting thereof, said apparatus comprising:

a supporting frame having a first and a second end wall and a first and a second side wall, said frame having a top and a bottom;

a first and a second cleaning board supported by said frame, said boards being disposed angularly relative to each other for defining there between a drain, the arrangement being such that when the fish is being cleaned, parts removed from the fish drain along said boards through said drain, a rod rotatably supported by said frame and disposed adjacent to said drain, said rod having a first and a second extremity;

a holder having a proximal and a distal end, said proximal end being secured to said rod, the fish being impaled on said distal end of said holder; and a handle secured to said rod for rotating said rod from a first location in which said holder is disposed adjacent to said first board for securely holding the fish against said first board for permitting cleaning of a first side of the fish, said handle permitting rotation of said rod to a second location thereof in which said holder is disposed adjacent to said second board for securely holding the fish against said second board for permitting cleaning of a second side of the fish.

2. A fish cleaning apparatus as set forth in claim 1 wherein said end walls are disposed parallel and spaced relative to each other;

said side walls extend between said end walls, said side walls being disposed parallel and spaced relative to each other.

3. A fish cleaning apparatus as set forth in claim 1 wherein said first side wall defines a V-shaped configuration adjacent to said top of said frame for supporting said boards;

said second side wall defines a further V-shaped configuration adjacent to said top of said frame for supporting said boards.

4. A fish cleaning apparatus as set forth in claim 1 further including:

a first extension extending from said first side wall adjacent to said top of said frame, said first extension defining a first hole, a second extension extending from said second side wall adjacent to said top of said frame, said second extension defining a second hole, the arrangement being such that said rod extends through said holes and is rotatably supported by said extensions.

5. A fish cleaning apparatus as set forth in claim 4 wherein said rod extends through said first hole and approximately three quarters way through said second hole;

said apparatus further including:

a threaded bolt having a first and a second end, said bolt extending through a coaxial bore defined by said rod;

a nut cooperating with said first end of said bolt and capturing said bolt within said bore;

said second end of said bolt extending through a remaining approximately one quarter of a way through said second hole;

a wing nut threadably engaging said second end of said bolt so that when said wing nut is tightened, said wing nut reacts with said second side wall so as to brake said rod within said second hole against rotation thereof.

6. A fish cleaning apparatus as set forth in claim 1 wherein each of said boards is of rectangular configuration;

said first board being secured to said top of said frame by said first end wall and said side walls, said first board extending from said first end wall in a direction from said drain towards said first end wall;

said second board being secured to said top of said frame by said second end wall and said side walls, said second board extending from said second end wall in a further direction from said drain towards said second end wall.

7. A fish cleaning apparatus as set forth in claim 1 wherein said rod is of cylindrical configuration and is disposed above said drain.

8. A fish cleaning apparatus as set forth in claim 1 wherein said holder extends perpendicularly away from said rod such that when said rod is rotated, the fish impaled on said holder is moved between said locations.

9. A fish cleaning apparatus as set forth in claim 1 wherein said proximal end of said holder is receivably secured within an orifice defined by said rod;

said distal end of said holder defines a point for facilitating impalement of the fish.

10. A fish cleaning apparatus as set forth in claim 1 wherein said handle is secured to said first extremity of said rod, said handle being disposed parallel and spaced relative to said holder.

11. A fish cleaning apparatus as set forth in claim 1 further including:

a first plurality of spikes protruding from said first board such that when said rod is disposed in said first location thereof, the second side of the fish is securely positioned against said first spikes for facilitating cleaning of the first side of the fish;

a second plurality of spikes protruding from said second board such that when said rod is disposed in said second location thereof, the first side of the fish is securely positioned against said second spikes for facilitating cleaning of the second side of the fish.

12. A fish cleaning apparatus as set forth in claim 1 further including:

a catch pan removably disposed within said frame beneath said drain for catching the parts removed from the fish;

said pan including:

a framework of rectangular configuration;

a panhandle extending from said framework for moving said pan relative to said frame;

a screen extending across said framework for separating the parts removed from the fish.

13. A fish cleaning apparatus as set forth in claim 1 further including:

a wing nut threadably engaging said second extremity of said rod such that when said wing nut is tightened, said rod is locked against rotation thereof so that said holder and fish impaled thereon are selectively disposed in said first and second locations for permitting cleaning and descaling of both sides of the fish.

14. A fish cleaning apparatus as set forth in claim 1 wherein said frame and said boards are fabricated from wood.

15. A fish cleaning apparatus for securely holding a fish during cleaning and filleting thereof, said apparatus comprising:

a supporting frame having a first and a second end wall and a first and a second side wall, said frame having a top and a bottom;

a first and a second cleaning board supported by said frame, said boards being disposed angularly relative to each other for defining there between a drain, the arrangement being such that when the fish is being cleaned, parts removed from the fish drain along said boards through said drain;

a rod rotatably supported by said frame and disposed adjacent to said drain, said rod having a first and a second extremity;

a holder having a proximal and a pointed distal end, said proximal end being secured to said rod, the fish being impaled on said pointed distal end of said holder;

a handle secured to said rod for rotating said rod from a first location in which said holder is disposed adjacent to said first board for securely holding the fish against said first board for permitting cleaning of a first side of the fish, said handle permitting rotation of said rod to a second location thereof in which said holder is disposed adjacent to said second board for securely holding the fish against said second board for permitting cleaning of a second side of the fish; and said holder extending perpendicularly away from said rod such that when said rod is rotated, the fish impaled on said holder is moved between said locations.

16. A fish cleaning apparatus for securely holding a fish during cleaning and filleting thereof, said apparatus comprising:

a supporting frame having a first and a second end wall and a first and a second side wall, said frame having a top and a bottom;

a first and a second cleaning board supported by said frame, said boards being disposed angularly relative to each other for defining there between a drain, the arrangement being such that when the fish is being cleaned, parts removed from the fish drain along said boards through said drain;

a rod rotatably supported by said frame and disposed adjacent to said drain, said rod having a first and a second extremity;

a holder having a proximal and a pointed distal end, said proximal end being secured to said rod, the fish being impaled on said distal end of said holder;

a handle secured to said rod for rotating said rod from a first location in which said holder is disposed adjacent to said first board for securely holding the fish against said first board for permitting cleaning of a first side of the fish, said handle permitting rotation of said rod to a second location thereof in which said holder is disposed adjacent to said second board for securely holding the fish against said second board for permitting cleaning of a second side of the fish;

said apparatus further including:

a first plurality of spikes protruding from said first board such that when said rod is disposed in said first location thereof, the second side of the fish is securely positioned against said first spikes for facilitating cleaning of the first side of the fish; and a second plurality of spikes protruding from said second board such that when said rod is disposed in said second location thereof, the first side of the fish is securely positioned against said second spikes for facilitating cleaning of the second side of the fish.

* * * * *